United States Patent Office

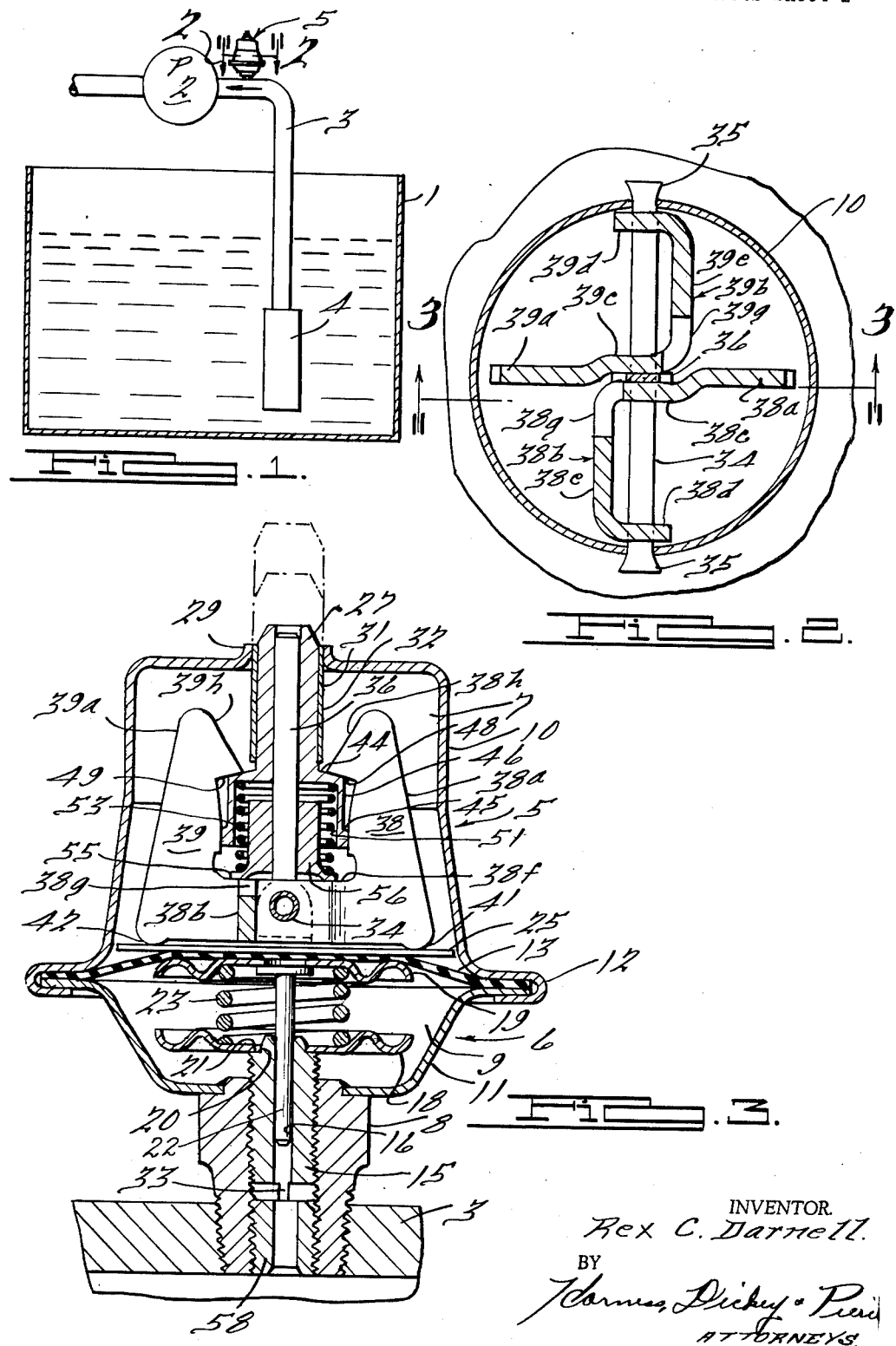

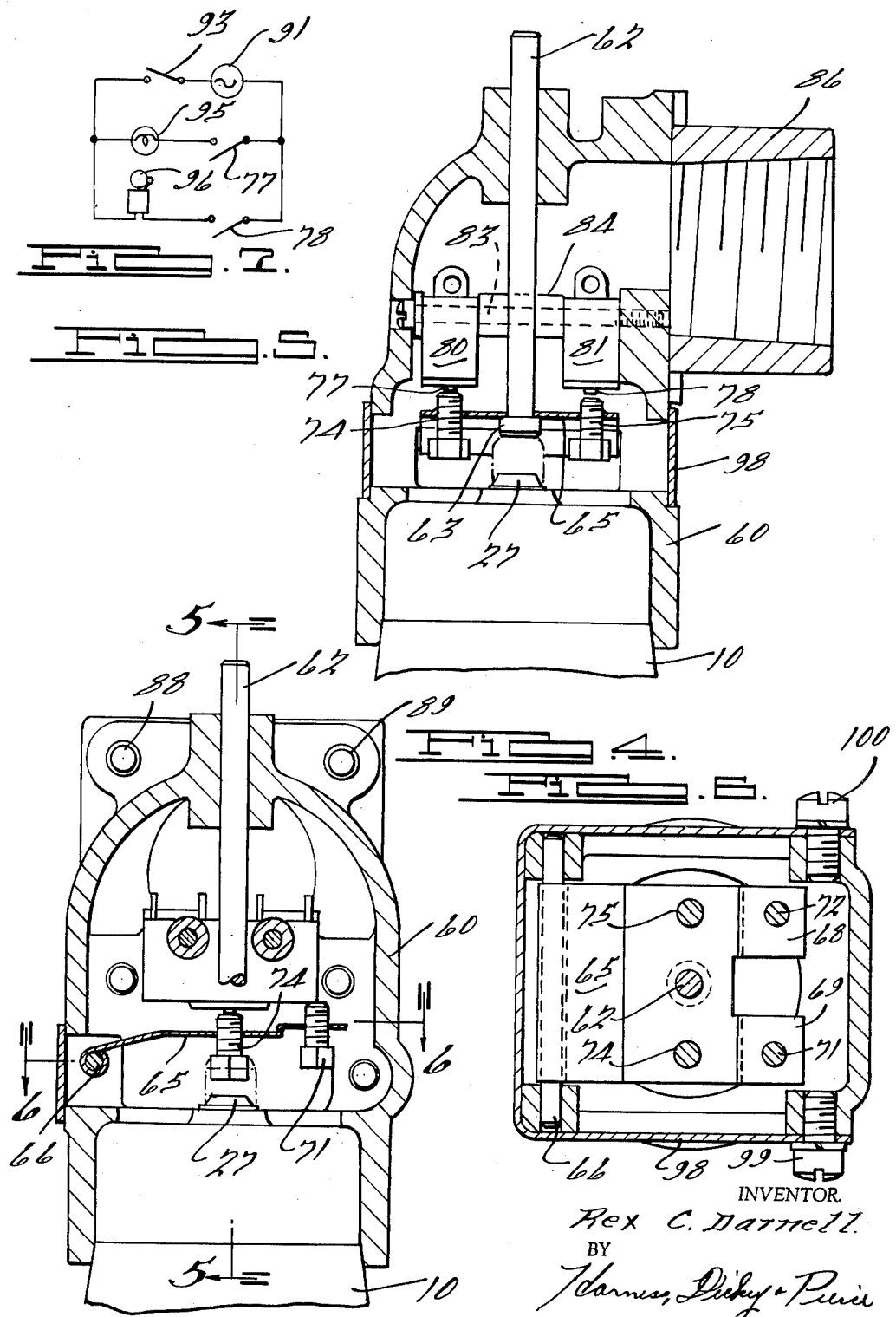

3,200,787
Patented Aug. 17, 1965

3,200,787
SUB-ATMOSPHERIC PRESSURE INDICATOR
Rex C. Darnell, Dexter, Mich., assignor to Michigan Dynamics, Inc., Detroit, Mich., a corporation of Michigan
Filed Dec. 18, 1963, Ser. No. 331,484
13 Claims. (Cl. 116—70)

This invention relates generally to a device for indicating the presence of a vacuum or sub-atmospheric pressure condition in a fluid circuit, and particularly to a device for indicating a preselected level of sub-atmospheric pressure.

As used herein, the expression "vacuum" refers to any pressure condition less than the atmospheric pressure of the environment in which the device is used. The expression is not intended to refer to an absolute void or absolute vacuum but rather to a fairly broad range of sub-atmospheric pressure conditions. For example, there are many fluid circuits where it is highly desirable to detect the occurrence of a particular level of vacuum lying in a range between 2 inches of mercury and 15 inches of mercury.

In a hydraulic circuit where a motivating pump is used to energize hydraulic components such as actuators and servo valve mechanisms, an excessive restriction to the flow of fluid upstream from the inlet of the pump can cerate a detrimental vacuum condition at the pump inlet. This vacuum condition will result in the expansion of air or other vapor which is always present in hydraulic fluid thereby increasing the relative volume of air to fluid in the system. An excessive proportion of air or other vapor to liquid can cause the pump to lose its "self-priming" ability. This phenomena is known in the trade as "pump cavitation." Cavitation not only reduces the output pressure of the pump, but the pump will experience severe shock due to the compressibility of the air in the hydraulic fluid. This shock loading of the pump drastically reduces its life.

A second problem area familiar to those in the hydraulic field is that of fluid contamination. To safeguard against excessive contamination of the fluid when the fluid reaches the pump, filters of various types are frequently installed in the fluid line upstream of the pump. As such filters collect foreign material, the pressure drop across the filter gradually increases to a prohibitive value until a suction head or vacuum is created upstream of the pump sufficient to cause cavitation.

The device of the present invention is designed so that it may be adjusted to indicate any predetermined value of vacuum or sub-atmospheric pressure condition in a fluid circuit. Conventional fluid circuits and conventional pumps generally are designed to withstand vacuums or sub-atmospheric pressure conditions of a minor extent. For example, a vacuum of less than 2 inches of mercury generally will not adversely affect the fluid circuit or pump. Heavier duty pumps and fluid circuits can even withstand greater vacuum conditions; thus, the indicator of the present invention may be adjusted to indicate only those vacuums or subatmospheric pressure conditions which will harm the fluid circuit, the pump or other components of the fluid circuit.

In the absence of some indicating means for alerting the attending technician of the presence of an undesirable vacuum in a fluid circuit, no adequate warning of impending pump damage exists. Thus, various manufacturers have produced devices which indicate the existence of an excessive vacuum or sub-atmospheric pressure condition in a fluid circuit. However, these devices are normally built into the filter assembly and as such are limited to indicating a vacuum or subatmospheric pressure condition in the filter assembly alone. The device of the present invention, however, is designed so that it may be installed in a conduit upstream of the pump or adjacent other components to be protected. This location is generally on the discharge side of the filter assembly but it may be at any point in the fluid line where desired.

It is therefore a primary object of the present invention to provide a device for detecting an undesirable level of vacuum in a fluid conduit and giving an indication of the same so that the vacuum creating condition may be alleviated and equipment subject to damage by the presence of the vacuum condition protected.

A further object of the present invention resides in the provision of a vacuum indicating device for a fluid circuit which can be tapped into any fluid conduit and which only requires a single fitting or connection to the fluid conduit.

A further object of the present invention resides in the provision of a vacuum indicating device for a fluid circuit in which the magnitude or level at which the device will respond can be accurately controlled.

A further object of the present invention resides in the provision of a vacuum indicating device which will respond to two levels of sub-atmospheric pressure conditions; first, to warn the attendant of an impending excess of vacuum in the fluid circuit and, second, to inform the attendant that an excessive vacuum exists in the fluid circuit so that the necessary corrective steps may be taken to alleviate the condition.

A further object of the present invention resides in the provision of a vacuum indicating device for a fluid circuit which is operable to give a visual indication when an excessive vacuum exists in the fluid circuit or, alternatively, may be adapted to close an electrical switch for controlling the functioning of an electrical circuit.

A further object of the present invention resides in the provision of a vacuum indicating device for a fluid circuit which is easily reset after indicating an excessive vacuum in the fluid circuit.

A further object of the present invention is to provide a vacuum indicating device of the above character operable to resist the effect of pressure surges in the hydraulic circuit.

A further object of the present invention is to provide a vacuum indicating device of the above character operable to maintain the vacuum orifice free from restrictions.

A further object of the present invention resides in the provision of a vacuum indicating device for a fluid circuit which is relatively inexpensive to manufacture, sturdy in construction and reliable in operation.

Further objects and advantages of the present invention will become more apparent from the following detailed description taken in conjunction with the drawings, in which:

FIGURE 1 is a view of a portion of a fluid pressure system showing a typical installation of a device of the present invention;

FIG. 2 is an enlarged sectional view of the device of the present invention taken along the line 2—2 of FIGURE 1;

FIG. 3 is a sectional view of the structure of FIGURE 2 taken along line 3—3 thereof;

FIG. 4 is a sectional view of a modified form of the invention incorporating switch means which is actuated upon the detection of an excessive vacuum condition;

FIG. 5 is a sectional view of the structure of FIGURE 4 taken along the line 5—5 thereof;

FIG. 6 is a sectional view of the structure of FIGURE 4 taken along line 6—6 thereof, and FIG. 7 is a diagrammatic view of an electrical circuit showing how the device of FIGURES 4–6 is operable to produce visual and audible signals.

Referring now to the drawings and especially to FIG-

URE 1, the the numeral 1 indicates a conventional fluid reservoir in which a fluid conduit 3 is situated. The conduit 3 has a strainger or filter 4 fitted on its end beneath the level of the fluid. A pump 2 is located in the line 3 which acts to pump fluid from the reservoir 1 through the filter 4 and the line 3. The numeral 5 identifies generally the indicating device of the present invention which is shown in greater detail in FIGURES 2 and 3. The indicating device included a housing 6 which incorporates thereon a threaded fitting 8 to enable the assembly to be installed in the conduit 3.

Before the indicating device is installed in the fluid conduit, it is calibrated and adjusted to operate at a predetermined sub-atmospheric pressure in the conduit. Thus, when a sub-atmospheric pressure of this predetermined value exists in the fluid conduit, the indicating device will be actuated and the attendant may make the necessary adjustments before any damage results to the fluid system or its components.

As is shown in FIGURE 3, the indicator housing 6 comprises an upper housing portion 10 sealingly joined to a lower housing portion 11 by a crimped flange 12. A flexible diaphragm 13 has its periphery secured between the housing portions 10 and 11 adjacent the flange 12 and divides the housing 6 into opposite chambers 7 and 9 which are sealed from each other.

The threaded fitting 8 is secured to the lower housing portion 11 by an appropriate means such as by a weld. Threadably received within the fitting 8 is an adjusting screw 15 which is provided with an axially extending hole 16 throughout its entire length. A lower spring support 18 is provided with a central opening 20 and is seated upon an annular shoulder 21 of the screw 15. An upper spring support 19 is spaced above the lower spring support 18 in axial alignment therewith these two spring supports carry therebetween a compression spring 23 which maintains spring support 19 in engagement with the lower surface of the diaphragm 13, as illustrated in FIGURE 3. The upper spring support 19 has fixed thereto one end of a downwardly depending pin 22 which has its other end freely received within the hole 16. The diameter of the pin 22 is sufficiently smaller than the hole 16 so that fluid from the conduit 3 easily passes into the chamber 9; however, the pin 22 will serve to retain the spring and support assembly 18, 19 and 23 in axial alignment as well as maintain the hole 16 free from contaminant and other foreign material as it moves therein. Axial movement of the adjustment screw 15 relative to the fitting 8 will vary the force applied to the flexible diaphragm 13 by the spring support 19 through the spring 23.

Fixedly carried at the upper surface of the flexible diaphragm 13 is a diaphragm plate 25 which will move axially therewith. As illustrated in FIGURE 3 the opening 16 in the screw 15 is open to the fluid conduit 3 and provides communication from this conduit 3 to the chamber 9 and the lower side of the diaphragm 13. Thus a vacuum in the conduit 3 and consequently in the chamber 9 will draw the diaphragm 13 downwardly against the action of the spring 23.

An indicating button 27 is shown in FIGURE 3 as being slidably received within the upper end of the upper housing portion 10 which has an upturned annular portion 29 defining a guide for the button 27. This indicating button carries around its outer periphery two bands 31 and 32 of different color. For example, the band 31 may be colored yellow while the band 32 may be colored red. These bands are secured to the button for movement therewith so that upward movement of the button 27 through the guide 29 will position the bands 31 and 32 exteriorly of the housing for visual observation.

The numeral 34 indicates a cross pin which is carried by the upper housing portion 10 and is disposed perpendicularly to the longitudinal axis of the button 27. The cross pin 34 is flared outwardly at each end 35 thereof and is thus fixedly retained within the upper housing portion 10. A centralizing pin 36 which is pivotally mounted on the cross pin 34 serves to guide the indicating button 27 by being slidably received therein.

A pair of latches 38 and 39 are pivotally mounted on the cross pin 34 and since these latches are identical only one will be described in detail. The latch 38 consists of an upstanding ear 38a and an integral generally U-shaped base portion 38b extending laterally thereof. A pair of leg portions 38c and 38d of the base 38b are provided with openings through which the cross pin 34 projects. The leg portions 38c and 38d are connected togethed by an integral intervening web portion 38e. The base portion 38b has a top planar surface 38f and a relieved portion 38g for a purpose to be hereinafter described. The latch 39 is designed in exactly the same manner and it should be understood that elements 39a, 39b, . . . 39g of the latch 39 correspond to elements 38a, 38b, . . . 39g of the latch 38. The legs 39c and 39d serve to pivotally mount the latch 39 on the cross pin 34.

As seen in FIGURE 2, the legs 38c and 39c of the latches 38 and 39, respectively, are adjacent each other with the centralizing pin 36 located therebetween. The legs 38d and 39d of the latches 38 and 39, respectively, extend adjacent the inner wall of the upper housing portion 10. Thus the latches 38 and 39 are free to pivot about the cross pin 34 but are prevented from excessive axial movement.

Each of the ears 38a and 39a of the latches 38 and 39 respectively, are formed with a bearing portion 41 and 42, respectively, which rests on the top of the diaphragm plate 25. The latch ear portions 38a and 39a are designed with tapered cam portions 38h and 39h, respectively, which aid in the resetting of the device, as will be described.

The indicating button 27 is formed with an annular downwardly and outwardly inclined shoulder 44. Below the shoulder 44 is a second downwardly and outwardly inclined annular shoulder 45. A cylindrical portion 46 joins the shoulders 44 and 45. The ears 38a and 39a of the latches 38 and 39, respectively, are provided with downwardly facing shoulders 48 and 49, respectively, adjacent the inner sides thereof. These shoulders 48 and 49 are complementary to the annular shoulders 44 and 45 on the button 27. The shoulders 48 and 49 are normally in engagement with the shoulder 44. However, the shoulders 48 and 49 are also engageable with the shoulder 45 in another position of the button 27, as will be subsequently described.

The button 27 is formed at its lower end with an enlarged bore portion 51 which receives a helical compression spring 53. The lower end of the spring 53 abuts against an annular shoulder 55 formed on a hollow cylindrical block 56 which is slidably mounted on the centralizing pin 36. The lower portion of the annular shoulder 55 is biased by the spring 53 against the upper surfaces 38g and 39g of the latches base portions 38b and 39b, respectively. It will, therefore, be seen that the spring 53 biases the button 27 upwardly and the block 56 downwardly. The annular shoulder 55 of the block 56 will act on the upper surfaces 38g and 39g of the latches 38 and 39 respectively, and this will tend to rotate the latch 38 clockwise and the latch 39 counterclockwise as viewed in FIGURE 3. It will be noted that the shoulder 55 will not engage the base portions 38b and 39b at the relieved portions 38g and 39g respectively. The button 27 acts against the latches 38 and 39 by the shoulder 44 acting against the shoulders 48 and 49 and this will also tend to rotate the latch 38 clockwise and the latch 39 counterclockwise as viewed in FIGURE 3. However, the plate 25 acts against the bearing surfaces 41 and 42 of the latches 38 and 39 respectively, by virtue of the force from the spring 23, and will tend to rotate the latch 38 counterclockwise and the latch 39 clockwise, thereby counterbalancing the action of the spring 53. As was pointed out hereinabove, all of the shoulders 44, 45, 48, and 49 have been designed with a taper. This is not critical, however, but merely aids in the functioning of the device.

Now, when the force of the spring 23 on the diaphragm 13 and the diaphragm plate 25 is counteracted by a sufficient pressure differential across the diaphragm, the diaphragm 13 and the diaphragm plate 25 will move downwardly. The latch bearing surfaces 41 and 42 will follow the diaphragm and upon sufficient diaphragm movement the latch shoulders 48 and 49 will move outwardly clear of the annular shoulder 44 of the button 27. The spring 53 will then force the button 27 upwardly until the shoulder 45 of the button 27 comes into engagement with the latch shoulders 48 and 49. The band 31 on the button 27 will now be exposed above the upturned flange 29 of the upper housing portion 10 as a warning to the attending technician that a vacuum of a predetermined magnitude exists in the conduit 3.

When a vacuum of a greater predetermined magnitude exists in the fluid conduit 3 and therefore in the chamber 9, a greater downward force will be exerted on the diaphragm 13 which further overcomes the axial force of the spring 23. The diaphragm plate 25 will therefore be moved further downwardly and the latch shoulders 48 and 49 will ultimately be moved outwardly beyond the shoulder 45 of the button 27, thereby allowing button 27 to move upwardly under the force of the spring 53 until the shoulder 44 abuts the upper portion of the lower housing portion 10. The band 32 will now be exposed above the upturned flange 29 thereby informing the attending technician that a vacuum of a greater predetermined magnitude exists in the fluid conduit 3.

After the necessary corrective steps have been taken by the attendant to alleviate the vacuum in the conduit 3, the indicating device may be manually reset merely by pushing the button 27 downwardly. Engagement of the cam surfaces 38h and 39h of the ears 38a and 39a respectively, will cause the ears to pivot outwardly to allow the shoulder 44 to be snapped in under the latch shoulders 48 and 49. Note also that the button 27 remains in an extended position, even after the vacuum has subsided (as when the pump is turned off), until the device is reset.

Under normal conditions when no vacuum exists in the fluid conduit 3, the axial force generated by the spring 23 against the diaphragm 13 and the diaphragm plate 25 will overcome the force of the spring 53 tending to rotate the latches 38 and 39 and keep the button 27 in its downward location. The spring 23 is designed so that a vacuum in conduit 3, and therefore in the chamber 9, of a selected magnitude in the fluid circuit will overcome the force of the spring 23 to such an extent that downward movement of the diaphragm 13 and the diaphragm plate 25 will result allowing the button 27 to move upwardly to expose the band 31. The spring 23 is further designed so that when a vacuum of the magnitude sufficient to damage the fluid circuit or any of its components exists in the fluid circuit this vacuum will overcome the force of the spring 23 to a greater extent thereby allowing the button 27 to move upwardly to expose the band 32. However, the device may be designed so that it will allow actuation of the indicating button at any predetermined level of vacuum in the fluid circuit.

In the manufacture of a device of this kind, it is difficult to hold the dimensions associated with these parts to extremely close tolerances since they are essentially stampings and are of a nature that the maintenance of close tolerances is somewhat impractical. However, the provision of the adjustment screw 15 overcomes this problem in that the technician may test the functioning of the indicating device and set the adjustment screw to cause the indicating button 27 to release at the desired vacuum values. A slot 33 may be formed in the end of the adjustment screw 15 to receive the end of a screw driver for this purpose. A locking plug 58 is provided at the lower end of the threaded fitting 8 and is press fitted internally thereof to provide a tamper-proof feature for the adjustment screw 15, so that once the adjustment screw 15 has been set by the technician, the locking plug 58 can then be pressed into the threaded fitting 8 to lock the adjustment screw 15 in place. The locking plug 58 is designed with an axial opening 59 in communication with the opening 16 in the screw 11 and with the fluid conduit 3.

In hydraulic circuits, the fluid conduits, pumps, and other components are many times located where it would be difficult and impractical to observe the type of indicator shown in FIGURES 2 and 3. For this reason the indicating attachment shown in FIGURES 4, 5 and 6 may readily be installed. In this device a visual and audible alarm system offers an attention-getting means for accomplishing the desired results. The indicating attachment shown in FIGURES 4, 5 and 6 is simply attached to the upper end of the indicating device illustrated in FIGURE 3.

Turning now to FIGURES 4 and 5, an embodiment of the invention is illustrated in which the device 5 of FIGS. 1–3 is arranged to operate an electric switch. In this embodiment a casting or housing is clamped by suitable means (not shown) over the upper housing portion 10 of the indicating device shown in FIGURE 3. The casting 60 is provided with a slidable actuating or reset pin 62 which has a head 63 at its lower end engageable with the top of the indicating button 27. The reset pin 62 passes through a flexible arm 65 and its head 63 engages the underside of the arm 65 generally in the middle thereof. The arm 65 is pivoted at one end thereof on a pivot pin 66 mounted in the casting 34 and has two extensions 68 and 69 at the other end thereof, which are shown as threadedly receiving a pair of safety screws 71 and 72 respectively. The flexible switch actuating arm 65 also threadedly receives and adjustably carries a pair of switch actuating screws 74 and 75 at the intermediate portion thereof. These screws 74 and 75 are shown in FIGURE 4 and FIGURE 5 to be engageable with a pair of switches 77 and 78, respectively, upon upward movement of the switch actuating arm 65. The switches 77 and 78 are carried by a pair of switch housings 80 and 81 respectively, fixedly mounted in the casting 60 by a screw 83 and a spacer 84.

ating screws 74 and 75 at the intermediate portion thereof. These screws 74 and 75 are shown in FIGURE 4 and FIGURE 5 to be engageable with a pair of switches 77 and 78, respectively, upon upward movement of the switch actuating arm 65. hTe switches 77 and 78 are carried by a pair of switch housings 80 and 81 respectively, fixedly mounted in the casting 60 by a screw 83 and a spacer 84.

An electric conduit thimble 86 is mounted on the casting 60 by a pair of screws 88 and 89. Appropriate wires or conductors are provided on the switches 77 and 78 and are connected to a source of electrical current 91 shown in FIGURE 7. A manual switch 93 shown in FIGURE 7 is operable to activate this indicating device.

The diagrammatic electrical circuit shown in FIGURE 7 illustrates one type of indicating system which can be actuated by the switches 77 and 78. As illustrated in FIGURE 7, switches 80 and 81 are disposed in parallel relationship in the electrical circuitry. In series with the switch 80 is an alarm 95 which may be an electric light bulb, while an alarm 96 is disposed in series with a switch 81. The alarm 96 may be an audible type alarm such as a bell. Thus, after the device is activated by closing the switch 93, should switch 80 be closed electrical current will flow through the bulb 95 and cause it to light. However, if both the switches 80 and 81 are closed the bulb 95 will light and the bell 96 will sound as electrical current will flow through both parallel circuits from the source 91.

The circuit of FIG. 7 is intended for illustration only and it is to be understood that any alarm means may be substituted for those shown therein. Further, the switch 81 may be wired to perform any desired operation. For example, closing of the switch 81 may discontinue operation of the pump 2.

The switch actuating screws 74 and 75 are adjustable on the switch actuating arm 65 so that the switch 77 is closed by the screw 74 when the indicating button is moved upwardly into its first indicating position. The switch 78 is closed by the screw 75 when the indicating button is moved into its second indicating position thereby causing the arm 65 to twist counterclockwise as viewed in FIG. 5. In other words, when the indicating button 27 is moved upwardly to expose the band 31 the head 63 will move the switch actuating arm 65 upwardly until the screw 74 engages and closes the switch 77. Also when the indicating button is moved upwardly to expose the band 32 above the upper housing portion 10 the switch actuating arm will carry the screw 75 into engagement with the switch 78 to close the same. However, in order to prevent damage to the internal mechanisms of switches 77 and 78, the safety stop screws 71 and 72 are provided. The screw 71 is adjusted so that it will abut the switch housing 80 immediately upon closing of the switch 77. Thus when the indicating button 27 is moved upwardly into its second indicating stage, the screw 71 will prevent the screw 74 from moving any further upwardly. Consequently, the switch actuating arm 65 will twist counterclockwise as viewed in FIGURE 5 thereby allowing the screw 75 to engage and close the switch 78. The screw 72 is adjusted to abut the switch housing 81 immediately upon closing of the switch 78. A cover 98 surrounds the casting 60 and is retained thereon by a pair of screws 99 and 100. Thus by removing the cover 98 one may readily adjust any of the screws 71, 72, 74 and 75.

Thus, in operation, upon closing of the switch 77 the indicating light 95 will be activated, and upon closing of the switch 78 the bell alarm 96 will be activated. The indicating light 95 therefore informs the attending technician that the indicating button 27 has moved into its first indicating position and that a vacuum of undesirable quantity exists in the fluid line while the bell alarm 96 informs the attending technician that the button 27 has moved into its second indicating position and that immediate steps must be taken to prevent damage to the fluid circuit and its components.

After the attending technician has made the appropriate adjustments in the fluid circuit to alleviate the undesirable vacuum or subatmospheric pressure condition, the indicating device may then be reset merely by pressing down on the reset pin 62. This pin 62 will act upon the upper end of the indicating button 27 through the head 63 and reset the indicating device in the same manner as was done and set forth in the operation of the device of FIGURE 3.

While the preferred form of the invention has been shown and described herein it should be understood that various changes may be made in the details of construction and in the arrangement of the several parts within the scope of the claims without departing from the spirit of the invention.

What is claimed is:

1. A vacuum indicating device including a hollow housing, a pressure responsive member movably disposed within said housing and forming therewith a closed pressure chamber on one side of said pressure responsive member with the other side thereof exposed to atmospheric pressure, compression spring means having one end operatively engaging said pressure responsive member and normally biasing said pressure responsive member in one direction, said pressure responsive member being movable in a direction compressing said spring means when a sub-atmospheric pressure exists in said chamber, an indicator element on the other side of said pressure responsive member, means normally biasing said indicator element in a direction away from said pressure responsive member, movable latching means for said indicator element, said pressure responsive member operatively engaging and biasing said latching means into locking engagement with said indicator element when a first predetermined pressure exists in said pressure chamber, said latching means being movable to an unlocking position upon movement of said pressure responsive member in a direction compressing said spring means to release said indicator element for movement in the given direction in response to a second predetermined pressure in said pressure chamber which is less than said first predetermined pressure.

2. A vacuum indicating device including a hollow housing, a pressure responsive member movably mounted in said housing and forming therewith a closed pressure chamber on one side of said pressure responsive member with the other side thereof exposed to atmospheric pressure, a first compression spring means in engagement with said pressure responsive member and normally biasing said pressure responsive member in one direction, said pressure responsive member being movable in a direction compressing said spring means when a sub-atmospheric pressure exists in said chamber, an indicator element having an outwardly extending tapered shoulder disposed within said housing and on the other side of said pressure responsive member, second compression spring means biasing said indicator element in a direction away from said pressure responsive member, movable latching means movably mounted upon said housing and having a tapered shoulder engaging said indicator shoulder, said pressure responsive member engaging and biasing said latching means toward said indicator to position said shoulders in engagement, said latching means being free to move away from said indicator in response to movement of said pressure responsive member in a direction compressing said first spring means.

3. A vacuum indicating device including a hollow housing, a pressure responsive member disposed within said housing and forming therewith a closed pressure chamber on one side of said pressure responsive member with the other side thereof exposed to atmospheric pressure, said pressure responsive member being movable in one direction when a sub-atmospheric pressure exists in said chamber, biasing means operatively engaging said pressure responsive member to oppose movement thereof in said one direction, an indicator element on the other side of said pressure responsive member, said indicator element having a first generally radially extending locking shoulder and a second generally radially extending locking shoulder spaced radially outwardly of and axially from said first shoulder, a latch movably mounted upon said housing and engaging said pressure responsive member and having a locking shoulder engaging said first indicator locking shoulder to thereby lock said indicator element in a first position when a first predetermined pressure exists in said chamber, means normally biasing said indicator element toward a first indicating position, said latch being movable to permit movement of said latch locking shoulder away from said first indicator locking shoulder when a second predetermined pressure less than said first predetermined pressure exists in said chamber whereby said indicator moves to its second position and said latch locking shoulder engages said second indicator locking shoulder, said latch members being pivotable further when a pressure less than said second predetermined pressure exists in said pressure chamber to permit movement of the latch locking shoulders away from said second indicator locking shoulder.

4. A vacuum indicating device including a hollow housing, a pressure responsive member movably disposed within said housing and forming therewith a closed pressure chamber on one side of said pressure responsive member with the other side thereof exposed to atmospheric pressure, a first compression spring means having one end in engagement with said pressure responsive member and normally biasing said pressure responsive member in a first direction, said pressure responsive member being movable in a direction compressing said first spring means when a sub-atmospheric pressure exists in said chamber, an indicator element on the other side of said pressure responsive member, said indicator element having an enlarged bore portion at one end thereof and a generally radially outwardly extending shoulder, second compression spring means disposed in said enlarged bore portion and biasing said indicator element in one direction, latch means movably mounted within said housing and having a locking shoulder engaging the indicator shoulder, said pressure responsive member engaging and biasing said latch means toward said indicator with said shoulders in locking engagement when a first predetermined pressure exists in said pressure chamber, said second spring means having its other end engaging and biasing said latching means toward an unlocking position whereby movement of said pressure responsive member in a direction compressing said first spring means in response to a second predetermined pressure less than said first predetermined pressure permits movement of said latching means to a position with said shoulders disengaged.

5. A vacuum indicating device including a hollow housing, a pressure responsive member movably disposed within said housing and forming therewith a closed pressure chamber on one side of said pressure responsive member with the other side thereof exposed to atmospheric pressure, compression spring means having one end thereof in engagement with said pressure responsive member and normally biasing said pressure responsive member in one direction, means for adjusting said compression spring means, said pressure responsive member being movable in a direction compressing said spring means when a sub-atmospheric pressure exists in said chamber, an indicator element on the other side of said pressure responsive member, means engaging said indicator element and biasing said indicator element in one direction, releasable latching means for said indicator element when a predetermined pressure exists in said pressure chamber, said pressure responsive member biasing said latching means into locking engagement with said indicator element, said latching means being movable away from said indicator element upon movement of said pressure responsive member against said spring means in response to the pressure in said pressure chamber falling below said predetermined value.

6. A vacuum indicating device including a hollow housing, a pressure responsive member disposed within said housing and forming therewith a closed pressure chamber on one side of said pressure responsive member, with the other side thereof exposed to atmospheric pressure, said pressure responsive member being movable in one direction when a sub-atmospheric pressure exists in said chamber, biasing means operatively engaging said pressure responsive member to oppose movement thereof in said one direction, an elongated indicator element on the other side of said pressure responsive member and having a first generally radially extending locking shoulder and a second generally radially extending shoulder spaced radially outwardly and axially from said first locking shoulder, a pair of latch members pivotally mounted upon said housing adjacent said indicator element, each of said latch members having a portion thereof operatively engaging said pressure responsive element to hold said latch members in a first position when a first predetermined pressure exists in said pressure chamber, each of said latch members having a locking shoulder engaging said first indicator locking shoulder when said latch members are in said first position to thereby lock said indicator element in a first position, resilient means operatively engaging said indicator element to bias said indicator toward a second position, said latch members being pivotable a predetermined amount to permit movement of the locking shoulders thereof away from said first indicator locking shoulder when a second predetermined pressure less than said first predetermined pressure exists in said pressure chamber, whereby said indicator element moves to its second position and said latch locking shoulders engage said indicator second locking shoulder, said latch members being pivotable further when a pressure less than said second predetermined pressure exists in said pressure chamber to permit movement of the latch locking shoulders away from said second indicator locking shoulder.

7. A vacuum indicating device including a hollow housing, a pressure responsive member movably disposed within said housing and forming therewith a closed pressure chamber on one side of said pressure responsive member with the other side thereof exposed to atmospheric pressure, conduit means communicating said pressure chamber with a fluid conduit, compression spring within said pressure chamber and having one end means in engagement with said pressure responsive member and normally biasing said pressure responsive member in one direction, elongated means movable with said one end of said compression spring means and slidably disposed in said conduit means for maintaining said opening free from foreign matter, said pressure responsive member being movable in a direction compressing said spring means when a sub-atmospheric pressure exists in said chamber, an indicator element on the other side of said pressure responsive member, resilient means engaging said indicator element and biasing said indicator element in a given direction, releasable latching means for said indicator element and having a portion thereof operatively engaging said pressure responsive member, said pressure responsive member biasing said latching means into locking engagement with said indicator element when a predetermined pressure exists in said pressure chamber, said latching means being movable to an unlocking position upon movement of said pressure responsive member in a direction compressing said spring means in response to the pressure in said pressure chamber falling below said predetermined value to release said indicator element for movement in the given direction.

8. A vacuum indicating device including a first hollow housing, a pressure responsive member movably mounted in said first housing and forming therewith a closed pressure chamber on one side of said pressure responsive member with the other side thereof exposed to atmospheric pressure, compression spring means having one end in operative engagement with said pressure responsive member and normally biasing said pressure responsive member in one direction, said pressure responsive member being movable in a direction compressing said spring means when a sub-atmospheric pressure exists in said chamber, an indicator element having an outwardly extending shoulder disposed within said first housing on the other side of said pressure responsive member, means biasing said indicator element in the direction of said shoulder, latching means movably mounted upon said first housing and having a shoulder engaging said indicator shoulder, said pressure responsive member engaging and biasing said latching means toward said indicator element with said shoulders in engagement when a first predetermined pressure exists in said pressure chamber, said latching means being free to move away from said indicator in response to a second predetermined pressure less than said first predetermined pressure to release said indicator element for movement in said direction, a second housing removably attached to said first housing, switch actuating means in said second housing movable in response to movement of said indicator element, and electrical switch means in said second housing positioned to be engaged and closed by said switch actuating means when said indicator element is moved in the given direction.

9. A vacuum indicating device including a first hollow housing, a pressure responsive member in said first housing and forming therewith a closed pressure chamber on one side of said pressure responsive member with the other side thereof exposed to atmospheric pressure, said pressure responsive member being movable in one direction when a sub-atmospheric pressure exists in said chamber, biasing means operatively engaging said pressure responsive member to oppose movement thereof in said one direction, an indicator element on the other side of said pressure responsive member, said indicator element having a first generally radially extending locking shoulder and a second generally radially extending locking shoulder spaced radially outwardly of and axially from said first shoulder, a latch movably mounted upon said housing and engaging said pressure responsive member and engaging said first indicator locking shoulder to thereby lock said indicator element in a first position when a first predetermined pressure exists in said chamber, means normally biasing said indicator element toward to a second position, said latch being movable to permit movement of said latch locking shoulder away from said first indicator locking shoulder when a second predetermined pressure less than said first predetermined pressure exists in said chamber whereby said indicator moves to its second position and said latch locking shoulder engages said second indicator locking shoulder, said latch members being pivotable further when a pressure less than said second predetermined pressure exists in said pressure chamber to permit movement of the latch locking shoulders away from said second indicator locking shoulder, a second housing removably attached to said first housing, switch actuating means in said second housing movable in response to movement of said indicator element, a first electrical switch means in said second housing positioned to be engaged and closed by movement of said switch actuating means when said indicator element is moved to its second position, and a second electrical switch means in said second housing positioned to be engaged and closed by said switch actuating means when said indicator element is moved to its third position.

10. A vacuum indicating device including a hollow housing, a pressure responsive member disposed within said housing and forming therewith a closed pressure chamber on one side of said pressure responsive member with the other side thereof exposed to atmospheric pressure, said pressure responsive member being movable in one direction when a sub-atmospheric pressure exists in said chamber, biasing means operatively engaging said pressure responsive member to oppose movement thereof in said one direction, an indicator element on the other side of said pressure responsive member and having a first and second axially spaced locking means, a latch movably mounted upon said housing and engaging said pressure responsive member and having a locking means engaging said first locking means on said indicator thereby locking said indicator element in a first position when a first predetermined pressure exists in said chamber, means normally biasing said indicator element toward a second position, said latch being movable to permit movement of said latch locking means away from said first indicator locking means when a second predetermined pressure less than said first predetermined pressure exists in said chamber whereby said indicator moves to its second position and said latch locking means engages said second locking means, said latch being movable further when a pressure less than said predetermined pressure exists in the chamber to permit movement of the latch locking means away from said second indicator locking means.

11. A vacuum indicating device including a first hollow housing, a pressure responsive member in said first housing and forming therewith a closed pressure chamber on one side of said pressure responsive member with the other side thereof exposed to atmospheric pressure, said pressure responsive member being movable in one direction when a sub-atmospheric pressure exists in said chamber, biasing means operatively engaging said pressure responsive member to oppose movement thereof in said one direction, an indicator element on the other side of said pressure responsive member, said indicator element having a first generally radially extending locking means and a second generally radially extending locking means spaced radially outwardly of and axially from said first means, a latch movably mounted upon said housing and engaging said pressure responsive member and having a locking means engaging said first indicator locking means to thereby lock said indicator element in a first position when a first predetermined pressure exists in said chamber, means normally biasing said indicator element toward a second position, said latch being movable to permit movement of said latch locking means away from said first indicator locking means when a second predetermined pressure less than said first predetermined pressure exists in said chamber whereby said indicator moves to its second position and said latch locking means engages said second indicator locking means, said latch members being pivotable further when a pressure less than said second predetermined pressure exists in said pressure chamber to permit movement of the latch locking means away from said second indicator locking means, a second housing removably attached to said first housing, switch actuating means in said second housing movable in response to movement of said indicator element, a first electrical switch means in said second housing positioned to be engaged and closed by movement of said switch actuating means when said indicator element is moved to its second position, and a second electrical switch means in said second housing positioned to be engaged and closed by said switch actuating means when said indicator element is moved to its third position.

12. A vacuum indicating device including a first hollow housing, a pressure responsive member in said first housing and forming therewith a closed pressure chamber on one side of said pressure responsive member with the other side thereof exposed to atmospheric pressure, said pressure responsive member being movable in one direction when a sub-atmospheric pressure exists in said chamber, biasing means operatively engaging said pressure responsive member to oppose movement thereof in said one direction, an indicator element on the other side of said pressure responsive member, said indicator element having a first generally radially extending locking means and a second generally radially extending locking means spaced radially outwardly of and axially from said first means, a latch movably mounted upon said housing and engaging said pressure responsive member and having a locking means engaging said first indicator locking means to thereby lock said indicator element in a first position when a first predetermined pressure exists in said chamber, means normally biasing said indicator element toward a second position, said latch being movable to permit movement of said latch locking means away from said first indicator locking means when a second predetermined pressure less than said first predetermined pressure exists in said chamber whereby said indicator moves to its second position and said latch locking means engages said second indicator locking means, said latch members being pivotable further when a pressure less than said second predetermined pressure exists in said pressure chamber to permit movement of the latch locking mean away from said second indicator locking means, a second housing removably attached to said first housing, a first electrical switch mounted in said second housing, a second electrical switch mounted in said second housing and spaced from said first electrical switch, a pivotally mounted flexible arm engageable with said indicator element and pivotal in response to movement thereof whereby movement of said indicator element to its second position moves said arm into engagement with said first swtch and movement of said indicator element to its third position flexes said arm into engagement with said second switch.

13. A vacuum indicating device including a hollow housing, a pressure responsive member movably disposed within said housing and forming therewith a closed pressure chamber on one side of said pressure responsive member with the other side thereof exposed to atmospheric pressure, a first compression spring means having one end in engagement with said pressure responsive member and normally biasing said pressure responsive member in a first direction, said pressure responsive member being movable in a direction compressing said first spring means when a sub-atmospheric pressure exists in said chamber, an indicator element on the other side of said pressure responsive member, said indicator element having an enlarged bore portion at one end and first and second axially spaced generally radial shoulders extending outwardly thereof, second compression spring means disposed in said enlarged bore portion and biasing said indicator element in one direction, latch means pivotally mounted within said housing and having a locking shoulder thereon, said pressure responsive member engaging and biasing said latch means toward said indicator element with said latch locking shoulder in engagement with said first indicator shoulder when a first predetermined pressure exists in said chamber, said second spring means having its other end engaging and biasing said latch means toward an unlocking position whereby movement of said pressure responsive member in a direction compressing said first spring means in response to a second predetermined pressure less than said first predetermined pressure permits movement of said latch locking shoulder away from said first indicator shoulder whereupon said indicator element moves to a position where said latch locking shoulder engages said second indicator shoulder, said latch means being movable further when said pressure responsive member is moved in a direction further compressing said first spring means in response to a third predetermined pressure less than said second predetermined pressure to move said latch locking shoulder away from said second indicator shoulder.

References Cited by the Examiner
UNITED STATES PATENTS

| | | | |
|---|---|---|---|
| 891,627 | 6/08 | MacKenzie | 200—83 |
| 1,173,038 | 2/16 | Roschanek | 116—70 X |
| 1,300,291 | 4/19 | Morris | 116—117 |
| 1,368,927 | 2/21 | Harris | 116—34 |
| 2,710,627 | 6/55 | Wagner et al. | 137—557 |
| 2,953,659 | 9/60 | Edwards | 103—25 |
| 3,114,320 | 12/63 | Hughes | 200—83 |
| 3,129,690 | 4/64 | Nygard | 116—70 X |

LOUIS J. CAPOZI, *Primary Examiner.*

UNITED STATES PATENT OFFICE
CERTIFICATE OF CORRECTION

Patent No. 3,200,787                                          August 17, 1965

Rex C. Darnell

It is hereby certified that error appears in the above numbered patent requiring correction and that the said Letters Patent should read as corrected below.

Column 1, line 27, for "cerate" read -- create --; column 3, line 1, strike out "the", second occurrence; line 3, for "strainger" read -- strainer --; column 6, line 46, beginning with "ating screws" strike out all to and including "and a spacer 84." in line 53, same column 6; column 11, line 20, strike out "to", first occurrence; column 12, line 66, for "mean" read -- means --.

Signed and sealed this 12th day of July 1966.

(SEAL)
Attest:

ERNEST W. SWIDER
Attesting Officer

EDWARD J. BRENNER
Commissioner of Patents